(12) United States Patent
Torigoe et al.

(10) Patent No.: US 7,976,608 B2
(45) Date of Patent: Jul. 12, 2011

(54) METHOD AND APPARATUS FOR MANUFACTURING LOW MELTING POINT METAL FINE PARTICLES

(75) Inventors: Kiyoshi Torigoe, Miyazaki (JP); Masataka Shimizu, Miyazaki (JP); Kenji Yamamoto, Miyazaki (JP); Mitsuhiro Mizozoe, Miyazaki (JP); Hoshiro Takahashi, Mouka (JP); Tomohide Suzuki, Ibaraki (JP); Motohiro Murase, Miyazaki (JP)

(73) Assignees: Senju Metal Industry Co., Ltd., Tokyo (JP); Miyazaki Prefecture, Miyazaki (JP)

( * ) Notice: Subject to any disclaimer, the term of this patent is extended or adjusted under 35 U.S.C. 154(b) by 586 days.

(21) Appl. No.: 11/885,677

(22) PCT Filed: Mar. 9, 2005

(86) PCT No.: PCT/JP2005/004056
§ 371 (c)(1),
(2), (4) Date: May 27, 2008

(87) PCT Pub. No.: WO2006/095417
PCT Pub. Date: Sep. 14, 2006

(65) Prior Publication Data
US 2009/0151511 A1 Jun. 18, 2009

(51) Int. Cl.
*B22F 9/06* (2006.01)
(52) U.S. Cl. .......................................... 75/340; 75/370
(58) Field of Classification Search .................. None
See application file for complete search history.

(56) References Cited

U.S. PATENT DOCUMENTS

| | | | | |
|---|---|---|---|---|
| 4,371,436 A | * | 2/1983 | Farber | 209/268 |
| 4,976,777 A | * | 12/1990 | Ozawa et al. | 75/255 |
| 6,068,769 A | * | 5/2000 | Iio et al. | 210/315 |
| 2003/0085253 A1 | * | 5/2003 | Shimizu et al. | 228/56.3 |
| 2007/0213228 A1 | * | 9/2007 | Zhao | 505/430 |

FOREIGN PATENT DOCUMENTS

| | | |
|---|---|---|
| JP | 02118003 | 5/1990 |
| JP | 07258707 | 10/1995 |
| JP | 09010990 | 1/1997 |
| JP | 09049007 | 2/1997 |
| JP | 2003268418 | 9/2003 |
| WO | WO 03 035308 | 5/2003 |

* cited by examiner

*Primary Examiner* — George Wyszomierski
(74) *Attorney, Agent, or Firm* — Michael Tobias

(57) ABSTRACT

In a solder paste which is a mixture of a flux and low melting point metal particles, low melting point metal fine particles manufactured by a conventional method or apparatus therefor include particles having widely varying particle diameters. Accordingly, the solder paste could not completely fill the minute holes in a mask for application to minute solder portions by printing, or mask removability was poor. According to the present invention, a mixture of a heat resistant continuous phase liquid and coarse metal particles in molten state is passed through a porous membrane to form the coarse low melting point metal particles into fine particles with a predetermined diameter. An apparatus according to the present invention comprise a porous membrane between a heating and dispersing mechanism and a cooling mechanism, and a pressure vessel connected to the heating and dispersing mechanism for applying a high pressure to the heating and dispersing mechanism.

14 Claims, 4 Drawing Sheets

METHOD AND APPARATUS FOR MANUFACTURING LOW MELTING POINT METAL FINE PARTICLES

TECHNICAL FIELD

This invention relates to a method and apparatus suitable for manufacturing low melting point metal fine particles and particularly fine solder particles for use in solder paste which is used for soldering of printed circuit boards.

BACKGROUND ART

In recent years, the reflow method has been much used for soldering of electronic parts. The reflow method is a soldering method using solder paste. In this method, soldering is carried out by the steps of applying solder paste by printing and carrying out reflow heating. In the printing step of the reflow method, a mask having holes bored in locations corresponding to portions to be soldered is placed atop an object to be soldered, and solder paste is placed atop the mask and scraped with a squeegee to uniformly fill the holes in the mask with the solder paste. When the mask is then removed by pulling upwards, the solder paste which fills the holes in the mask is transferred to the portions to be soldered. This procedure is referred to as paste transfer. In the subsequent reflow heating step, after electronic parts are mounted on the portions of the object to which solder paste has been applied, the object is heated with a heating apparatus such as a reflow furnace to melt the applied solder paste for soldering. The reflow soldering method not only has excellent operability in that soldering of all the portions to be soldered can be carried out at one time but also has excellent reliability in that solder does not adhere to unnecessary locations.

Solder paste used in the reflow method is obtained by mixing solder particles and a pasty flux, and it has an appropriate consistency.

The state of recent electronic parts will be briefly described. With the trend towards multifunctionality and decreases in the size and weight of portable electronic equipment, chip-type parts are also becoming increasingly smaller, progressing from the 1005 size (10 mm×5 mm) to the 0603 size (6 mm×3 mm) and still further to the 0402 size (4 mm×2 mm). There is also a tendency for processing of semiconductors to move from wire bonding, which was formerly predominant, to flip chip mounting in order to attain decreases in size and high speed processing of signals. In advanced technological fields, there are increasingly severe demands concerning the quality, reliability, and price of parts. Cost is also becoming an important factor in flip chip mounting, and there has been a movement from gold bumps to solder bumps. Regarding solder bumps, a lot of research and development have been made on the stable bump formation by a method using solder paste, which is advantageous from a cost standpoint compared to solder plating or solder balls.

Normally, stable printing of solder paste and reliable paste transfer are desired when solder bumps are formed on a wafer by printing for minute surface mounting. In the formation of solder bumps on a wafer, the number of solder particles required to constitute one electrode is normally at least approximately 6 to 10 when they are arranged side by side. Assuming that an electrode formed on a 0402 size chip, has a diameter of 0.18 mm, it is necessary for solder particles to have a particle size which is obtained by a proper blend of #10 particles (5-15 micrometers in diameter) and #21 particles (15-25 micrometers in diameter). In the case of wafer bumps having a diameter of 100 micrometers, the upper limit on the diameter of solder particles is 10 micrometers, and in order to maintain stable paste transfer, a diameter of approximately 5-10 micrometers is desired.

Methods of manufacturing solder particles for use in solder paste include the atomizing method in which molten solder is dripped through a narrow nozzle into a drum and at the same time the resulting droplets are blown by high pressure gas to form fine particles (Patent Document 1), the rotating disk method in which molten solder is dripped onto a disk rotating at a high speed and is scattered by the centrifugal force of the rotating disk to form fine particles (Patent Document 2), and the agitation-dispersion method in which solder is charged into high temperature oil to melt, and the oil and the molten solder are agitated by an agitation-dispersion device to form fine particles (Patent Document 3). Solder particles obtained by these manufacturing methods for solder particles contain a wide range of large and small solder particles mixed together, with small ones having a size of several micrometers and large ones having a size of 100 micrometers or larger.

Patent Document 1: JP H 7-258707 A1
Patent Document 2: JP H 9-10990 A1
Patent Document 3: JP H 2-118003 A1

DISCLOSURE OF THE INVENTION

With a solder paste having a wide range of large and small solder particles mixed together in this manner, when it is applied to the portions to be soldered of the above-described minute chip-type parts or to locations of a wafer for forming solder bumps by printing with a mask, the solder paste may not completely fill the minute holes in the mask, or even if the holes are filled with solder paste, the paste transfer becomes poor, and printing cannot be neatly performed. Therefore, at present, a classification step is employed to control the particle diameter, but this causes problems including oxidation of solder particles during handling. This invention provides a method and apparatus for manufacturing low melting point metal particles for solder paste which can be neatly printed on minute portions to be soldered and which has good solderability.

The present inventors found that if liquid metal coarse particles (coarse liquid metal droplets) dispersed in a heat resistant continuous phase liquid are forced to pass through pores in a porous membrane together with the continuous phase liquid, the liquid metal coarse particles are divided into fine particles (fine liquid metal droplets) having a diameter approximately equal to or smaller than the pore diameter of the porous membrane, and they thereby completed the present invention.

LIST OF REFERENCE SYMBOLS

Figure 1:
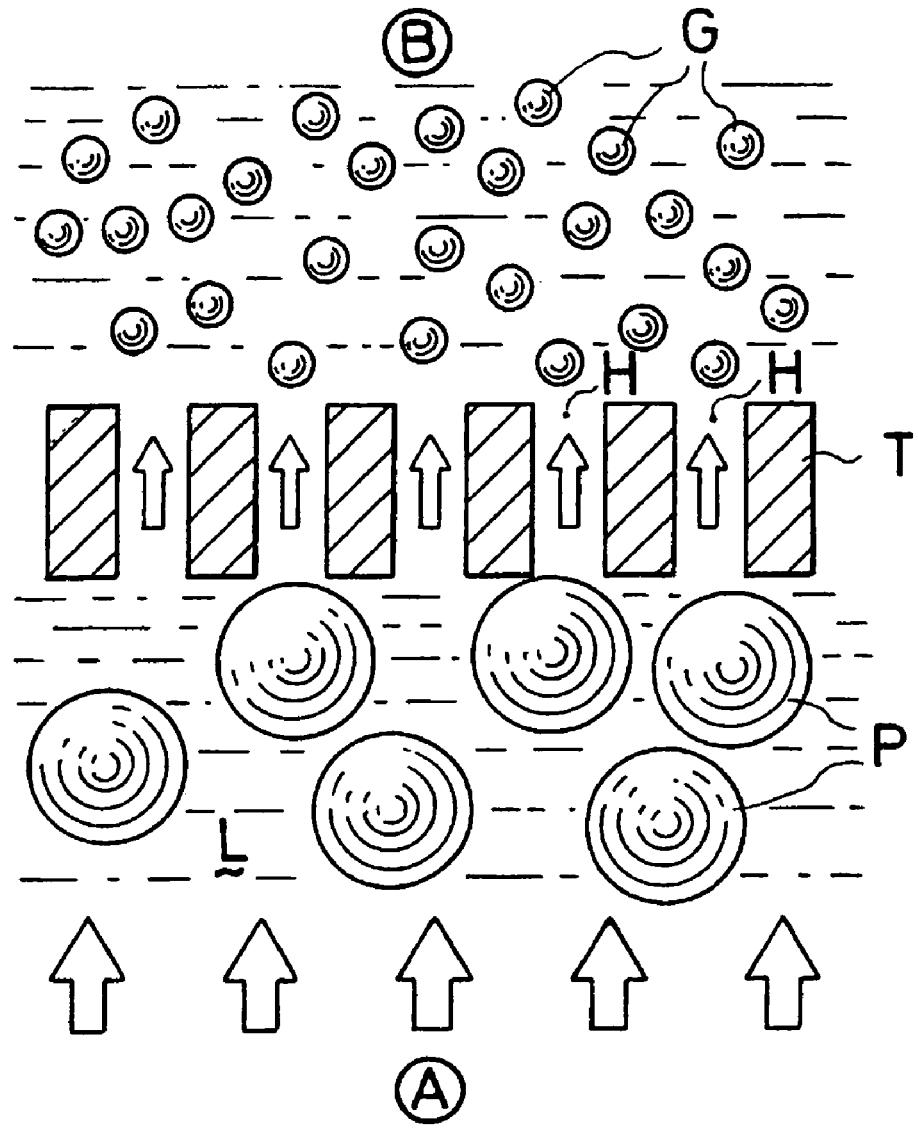
FIG. 1 is a schematic view for explaining the principles of forming fine metal particles in the present invention.

A: Pressure chamber side
B: Forming chamber side
T: Porous membrane
H: Pore
L: Heat resistant continuous phase liquid
P: Liquid metal coarse particle
G: Liquid metal fine particle

BEST MODE FOR CARRYING OUT THE INVENTION

In the present invention, fine particles of a low melting point metal having a desired particle diameter are obtained from the low melting point metal in the form of coarse particles. In order to distinguish the state of low melting point metal between before and after passage through a porous membrane, the state prior to passing through the porous membrane will be referred to for convenience as "coarse particles", and after passing through the porous membrane, it will be referred to as "fine particles". Metal in a molten state will be referred to as liquid metal, and metal in a solid state will be referred to as solid metal. In the present specification, metal having a melting point in the range of 100-250° C. will be referred to as "low melting point metal", and metal having a melting point of at most 100° C. will be specially classified as "ultralow melting point metal". When the low melting point metal is solder, that containing lead as a principal element will be classified as lead-containing solder, and that not containing it as a principal element will be classified as lead-free solder.

Terms used in this specification are defined as follows.

"Dispersion stabilizer" is the collective term for substances having the effect of suppressing coalescence of liquid metal particles.

In this specification, a mean particle diameter is the 50% diameter in a cumulative volume size distribution curve, and the size of individual particles is referred to as the particle diameter of the particles.

The pore diameter of a porous membrane means the pore diameter for which penetrating pore volume is 50% of the total in a relative cumulative pore volume distribution curve.

The present invention is a method of manufacturing low melting point metal particles characterized by applying at least a sufficient pressure to a mixture of coarse particles of a low melting point metal in a molten state and a continuous phase of a heat resistant liquid at a temperature of at least the melting point of the low melting point metal to cause the mixture to pass through a porous membrane is having at least two penetrating pores, thereby forming the liquid metal coarse particles into liquid metal fine particles of a diameter in a certain range, and then cooling the liquid metal fine particles and the heat resistant continuous phase liquid to below the melting point of the low melting point metal to obtain solid metal fine particles.

In another aspect, the invention is an apparatus for manufacturing low melting point metal particles characterized by comprising at least a dispersing mechanism capable of heating and dispersing liquid metal particles and a heat resistant continuous phase liquid, a porous membrane having at least two penetrating pores, and a cooling mechanism for cooling liquid metal particles which have passed through the porous membrane.

The principles of forming metal fine particles in the present invention are explained by referring to FIG. 1. One side of a porous membrane T having a large number of pores H is referred to as a pressure chamber side A, and the other side is referred to as a forming chamber side B. The pressure chamber side A contains liquid metal coarse particles P having a diameter which is larger than the diameter of the pores H in the porous membrane T together with a heat resistant continuous phase liquid L. By application of pressure (shown by the large arrows in the lower portion) from the pressure chamber side A, the large diameter liquid metal coarse particles P are forced to pass through the pores H in the porous membrane T together with the heat resistant continuous phase liquid L and move into the forming chamber side B. At this time, the large diameter liquid metal coarse particles P are formed into liquid metal fine particles G, with the size of the liquid metal fine particles G after passing through the pores H in the porous membrane T being determined by the pore diameter of the porous membrane and the speed of passage of the liquid metal coarse particles through the membrane. Namely, the particle diameter of the resulting liquid metal fine particles depends upon the pore diameter of the porous membrane being used, and depending upon the speed of passage through the porous membrane, a particle diameter of the same order as or smaller than the pore diameter of the porous membrane can be formed. Thus, by suitably setting these conditions, the particle diameter of the liquid metal fine particles formed after passing through the pores in the porous membrane can be controlled to be within a certain range.

There are no particular limitations on a low melting point metal used in the present invention as long as its melting point is 250° C. or lower. For example, lead-containing solder alloys such as Sn/Pb, Sn/Bi/Pb, Sn/Ag/Pb, Sn/Sb/Pb, Sn/Ag/Bi/Pb, and Sn/Sb/Ag/Pb alloys; lead-free solder alloys such as Sn, Sn/Ag, Sn/Cu, Sn/Bi, Sn/In, Sn/Zn, Sn/Sb, Sn/Ag/Cu, Sn/Zn/Bi, Sn/Cu/Sb, Sn/Bi/Ag, Sn/Bi/In, Sn/Cu/Ni, Sn/Zn/In, Sn/Ag/Bi/Cu, Sn/Ag/Cu/In, Sn/Ag/Cu/Sb, and Sn/Ag/Cu/Bi/In alloys; ultralow melting point metals such as Bi/Pb/Sn, Bi/Sn/Cd, Bi/Pb/Sn/Cd, and Bi/Pb/Sn/Cd/In alloys; and mixtures of these can be used. The melting points of these alloys with typical proportions (mass %) of the principal elements are 183° C. for a 63Sn/37Pb eutectic alloy, 172-190° C. for (46-60)Sn/(3-8)Bi/(37-46)Pb alloys, approximately 179° C. for (62-62.8)Sn/(0.4-2)Ag/(36-36.8)Pb alloys, 188-261° C. for (10-27)Sn/(3-8)Sb/(70-82)Pb alloys, 137-178° C. for (42-56)Sn/(1-3)Ag/(2-14)Bi/(39-42)Pb alloys, 180-186° C. for 65Sn/0.5Sb/0.4Ag/34.1Pb alloys, 232° C. for Sn, 221° C. for a 96.5Sn/3.5Ag eutectic alloy, approximately 222° C. for a 97Sn/3Ag alloy, 227° C. for a 99.25Sn/0.75Cu eutectic alloy, 139° C. for a 42Sn/58Bi eutectic alloy, 118° C. for a 48Sn/52In eutectic alloy, 199° C. for a 91Sn/9Zn eutectic alloy, 232° C. for a 99Sn/1Sb eutectic alloy, 232-240° C. for a 95Sn/5Sb alloy, 215-227° C. for (95.5-99)Sn/(0.3-3.5)Ag/(0.5-0.75)Cu alloys, 190-199° C. for (89-89.5)Sn/(7.5-8)Zn/3Bi alloys, 227-229° C. for (98.8-99)Sn/(0.7-0.9)Cu/0.3Sb alloys, 138-229° C. for (42-90.5)Sn/(7.5-57)Bi/(1-2)Ag alloys, 147-169° C. for a 70Sn/20Bi/10In alloy, 227-229° C. for a 99.2Sn/0.7Cu/0.1Ni alloy, 188° C. for a 86Sn/9Zn/5In alloy, 138-221° C. for (77.5-96)Sn/(2-3.2)Ag/(1-20)Bi/(0.5-0.75)Cu alloys, 214-217° C. for a 95.3Sn/3Ag/0.7Cu/1In alloy, 216-221° C. for (95.6-96.2)Sn/(2.5-3.4)Ag/(0.5-0.8)Cu/(0.2-0.5)Sb alloys, 204-215° C. for a 92.8Sn/3Ag/0.7Cu/1Bi/2.5In alloy, approximately 58° C. for 49Bi/18Pb/12Sn/other element alloys, 68° C. for a 50Bi/22Sn/2.8Cd alloy, 70-100° C. for (42.5-50)Bi/(26.7-37.7)Pb/(11.3-13.3)Sn/(8.5-10)Cd alloys, and 46.8° C. for a 44.7Bi/22.6Pb/8.3Sn/5.3Cd/In eutectic alloy. As long as a melting points of at most 250° C. is maintained, the above-described compositions may be modified, or other metals or minute elements may be added thereto.

A heat resistant continuous phase liquid used in the present invention can be any one having a boiling point higher than the melting point of the low melting point metal and in which a dispersion stabilizer which may be added can be adequately dissolved or uniformly dispersed. Various kinds of oil such as fats and fatty oils, waxes, petroleum oils, organic solvents, and synthetic oils can be used alone or as a mixture of two or more. Examples of preferred liquids are mineral oil, vegetable oil, and glycols. With ultralow melting point metal having a melting point of at most 100° C., water or high boiling point organic solvents such as toluene may also be used.

The heat resistant continuous phase liquid may be a single substance or a mixture, and it is also possible to add a dispersion stabilizer thereto. In the present invention, the presence or absence of a dispersion stabilizer does not essentially influence the process of forming the liquid metal fine particles. Accordingly, it is possible to form liquid metal fine particles without adding a dispersion stabilizer. However, a dispersion stabilizer can prevent coalescence of the liquid metal coarse particles prior to passing through the porous membrane or of the liquid metal fine particles after passing therethrough. Therefore, the addition of a dispersion stabilizer can increase both the yield of low melting point metal fine particles which are manufactured and the proportion of the liquid metal coarse particles relative to the heat resistant continuous phase liquid in the mixture, so it has the effect of increasing the productivity per unit time. There are no particular restrictions on the type of dispersion stabilizer which can be added to the heat resistant continuous phase liquid as long as it can uniformly disperse in the heat resistant continuous phase liquid and exhibits the effect of suppressing coalescence of liquid metal particles even when the temperature is near the melting point of the metal.

When an oil is used as the heat resistant continuous phase liquid, effective dispersion stabilizers are metallic soaps such as calcium stearate, calcium oleate, calcium ricinoleate, calcium laurate, calcium behenate, calcium octanoate, zinc stearate, zinc laurate, zinc palmitate, zinc myristate, zinc undecylenate, zinc oleate, zinc ricinoleate, zinc behenate, zinc salicylate, zinc naphthenate, magnesium stearate, magnesium myristate, magnesium oleate, aluminum stearate, aluminum behenate, aluminum octanoate, lead stearate, lead oleate, lead octanoate, lead naphthenate, as well as similar cobalt soap, nickel soap, iron soap, copper soap, manganese soap, tin soap, and lithium soap. In addition, saturated fatty acids such as butyric acid, caproic acid, caprylic acid, capric acid, lauric acid, myristic acid, palmitic acid, stearic acid, arachidic acid, and behenic acid, and unsaturated fatty acids such as oleic acid, linolic acid, linolenic acid, and erucic acid have the same dispersing effect as the above-mentioned metallic soaps due to their ability of orientation in the interface between the oil and the liquid metal. Furthermore, polyglycerol fatty acid esters which are esters of polyglyerol with caprylic acid, capric acid, lauric acid, myristic acid, palmitic acid, stearic acid, behenic acid, oleic acid, linolic acid, erucic acid, condensed ricinoleic acid, isopalmitic acid, isostearic acid, and a mixed fatty acid, as well as sucrose fatty acid esters such as sucrose stearate, sucrose palmitate, sucrose myristate, sucrose oleate, sucrose behenate, and sucrose erucate also exhibit a good dispersing action. Polyglycerol fatty acid esters and sucrose fatty acid esters are nonionic surfactants which are widely used as food additives. The hydrophilic or lipophilic properties of these esters vary depending upon the degree of polymerization of polyglycerol and the degree of esterification for polyglycerol fatty acid esters or the degree of esterification for sucrose fatty acid esters, and a suitable one can be selected by taking the type of heat resistant continuous phase liquid into consideration. When water or a glycol such as polyethylene glycol which is a water-miscible solvent is used as the heat resistant continuous phase liquid, an effective dispersion stabilizer includes an ordinary anionic, nonionic or cationic surfactant, as well as a high polymer surfactant, a fluorine-containing surfactant, an organometallic surfactant, and the like. Besides, some sugars such as sucrose exhibit the effect of suppressing coalescence. These may be used alone, or a mixture of two or more may be used.

Particularly suitable dispersion stabilizers for use in the present invention include tetraglycerol condensed ricinoleatec ester, sucrose fatty acid esters, and the like.

A porous membrane for use in an apparatus according to the present invention can be any one which has uniform penetrating pores and which does not degrade or break down at the melting temperature of the low melting point metal. The pores in the porous membrane may be of cylindrical or prismatic shape or other shape. Fine particles are formed whether the pores extend perpendicularly or diagonally with respect to the membrane surface or whether they have an entangled structure. What is important is that the hydraulic diameter and the effective length of the pores be uniform. Any porous membrane which has such a pore structure and has a heat resisting temperature higher than the melting point of the liquid metal can be used in the present invention. In general, there are many types of porous membrane in shape, such as pipe-shaped or flat membranes, and with regards to structure, they are classified as symmetric or asymmetric membranes and as uniform or nonuniform membranes. However, the shape and structure do not essentially influence the effects of the present invention, so they are not particularly restricted. Examples of materials of the porous membrane are glass, ceramics, silicon, heat resistant polymers, and metals. There is no particular restriction as long as they are not wet by liquid metal as indicated by a contact angle therewith which exceeds 90°.

In the present invention, the pressure necessary to force the liquid metal coarse particles to pass through the porous membrane is a very important factor. In this respect, it is possible to decrease the necessary pressure by using an asymmetric membrane having an asymmetric structure constituted by a skin layer having a desired pore diameter and a support layer having a larger pore diameter than the skin layer, compared to a symmetric membrane having the same membrane thickness and having the same pore diameter throughout the thickness as the skin layer of the asymmetric membrane.

Examples of porous membranes suitable for use in the present invention are porous glass membranes, porous inorganic ceramic membranes, and porous metal membranes.

In the present invention, there exists a critical pressure which is the minimum pressure necessary for forcing liquid metal coarse particles into the porous membrane. At a pressure below the critical pressure, the liquid metal coarse particles in the mixture is blocked by the porous membrane, and filtration takes place in which only the heat resistant continuous phase liquid passes through the porous membrane, eventually causing the pores in the porous membrane to be clogged by the liquid metal coarse particles deposited on the porous membrane. Even at a pressure above the critical pressure, if there is a portion of the mixture in which the proportion of the liquid metal coarse particles is locally high, the pressure required for forcing the liquid metal coarse particles into the membrane increases in that portion, and clogging may occur in the same manner as at below the critical pressure. Accordingly, it is desirable to allow the mixture to pass through the porous membrane rapidly in a state in which the liquid metal coarse particles are dispersed as uniformly as possible in the mixture.

For the above reasons, in order to smoothly pass the liquid metal coarse particles through the porous membrane at a predetermined pressure, it is advantageous that the concentration of the liquid metal particles in the mixture be uniform. For this purpose, a stirring device is provided inside a vessel containing the mixture, and the mixture is stirred by the stirring device so as to make the concentration of the liquid metal particles in the mixture as uniform as possible. Any type of stirring device can be used, but a preferred stirring device for use in the present invention is a stirrer or propeller. As long as the liquid metal coarse particles can be uniformly dispersed in the mixture, the present invention is not limited to the above-described stirring device, and any type of commercially available dispersing or mixing device can be used.

Figure 2:
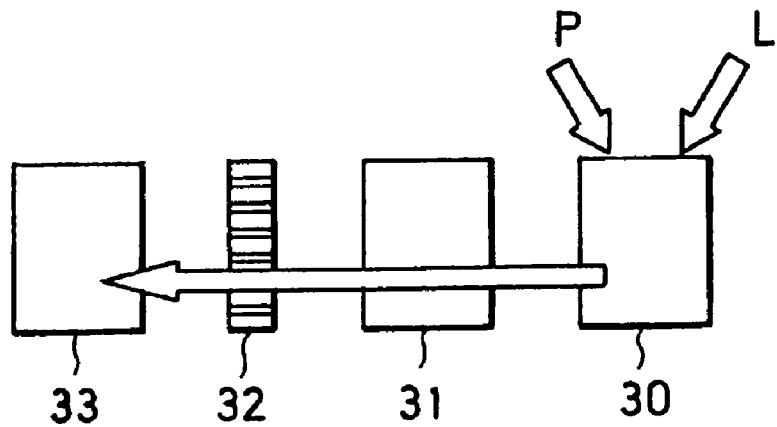
FIG. 2 is a conceptual view showing the basic structure of a manufacturing apparatus according to the present invention.

Below, an apparatus for manufacturing low melting point metal particles according to the present invention will be described based on the drawings. FIG. 2 is a conceptual diagram showing the basic structure of a manufacturing apparatus for low melting point metal particles (referred to below simply as a manufacturing apparatus) according to the present invention, FIGS. 3 and 4 are conceptual views of the basic structure in which the particle size of the liquid metal particles are made more uniform, FIGS. 5(1)-(4) are schematic views showing different arrangements of the main portion of the manufacturing apparatus, and FIG. 6 is an explanatory view of an embodiment of the manufacturing apparatus of FIG. 5(1).

First, the conceptual view of the basic structure shown in FIG. 2 will be described. The manufacturing apparatus comprises a dispersing mechanism (vessel) 30, a liquid pump 31, a porous membrane (membrane-type porous body) 32, and a cooling mechanism (vessel) 33. Low melting point metal coarse particles P and a heat resistant continuous phase liquid L are introduced into the dispersing mechanism 30 and become a mixture therein. In the dispersing mechanism 30, the heat resistant continuous phase liquid which is already heated at a temperature of at least the melting point of the low temperature metal coarse particles may be initially introduced, and the low melting point metal (alloy) coarse particles are then added to the heat resistant continuous phase liquid, thereby melting the low melting point alloy coarse particles. Alternatively, the heat resistant continuous phase liquid at a low temperature and the low melting point alloy coarse particles can be introduced at the same time into the dispersing mechanism, and the heat resistant continuous phase liquid and the low melting point alloy coarse particles can be heated by an electric heater disposed in the dispersing mechanism to melt the low melting point alloy coarse particles. What is important is that a mixture in which the low melting point alloy coarse particles in a molten state are uniformly dispersed in the heat resistant continuous phase liquid be formed in the dispersing mechanism.

The mixture of the low melting point alloy coarse particles in a molten state and the heat resistant continuous phase liquid in the dispersing mechanism 30 is then pumped under pressure by the liquid pump 31 so as to pass through the porous membrane 32, resulting in the formation of low melting point alloy fine particles in a molten state having a uniform particle size. Thereafter, the low melting point alloy fine particles in a molten state are cooled in the cooling mechanism 33 to form solid low melting point alloy fine particles, which are recovered by a suitable recovery mechanism.

Figure 3:
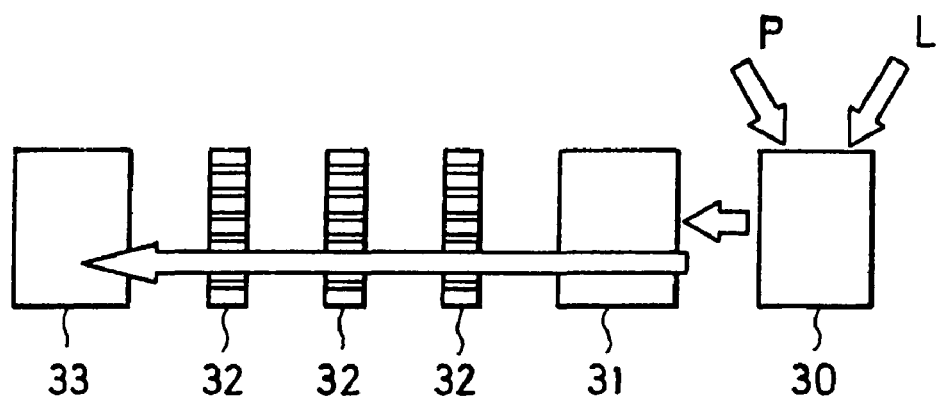
FIG. 3 is a conceptual view showing a variation of the basic structure for obtaining more uniform metal particles.
Figure 4:
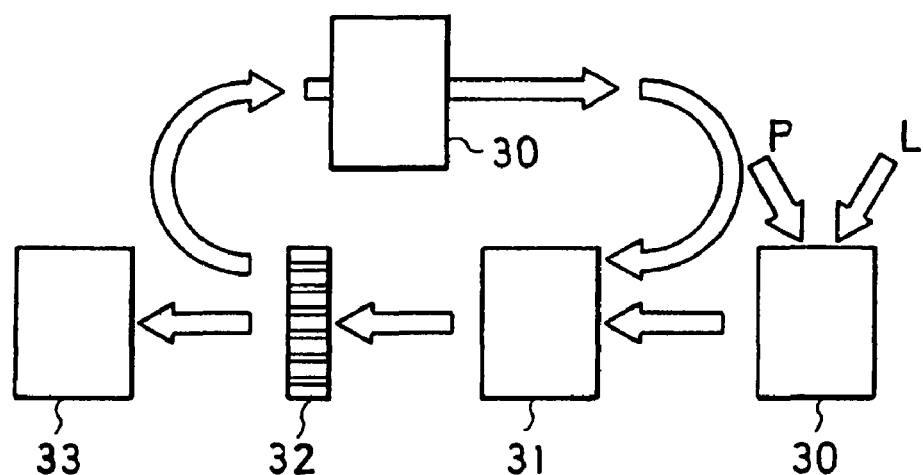
FIG. 4 is a conceptual view showing another variation of the basic structure for obtaining more uniform metal particles.

FIGS. 3 and 4 are conceptual views of manufacturing apparatuses for making the particle size of the low melting point alloy fine particles even more uniform than with the basic structure of FIG. 2. The same parts as in FIG. 2 are indicated by the same reference numbers, and an explanation thereof will be omitted. In FIG. 3, a mixture of a heat resistant continuous phase liquid and low melting point alloy coarse particles in a molten state are passed through a plurality of porous membranes 32. As the mixture passes through the plurality of porous membranes, the particle size of the alloy particles becomes more uniform. In FIG. 4, such a mixture is passed through a single porous membrane 32 repeatedly, as a result of which the particle size becomes uniform.

Figure 5:
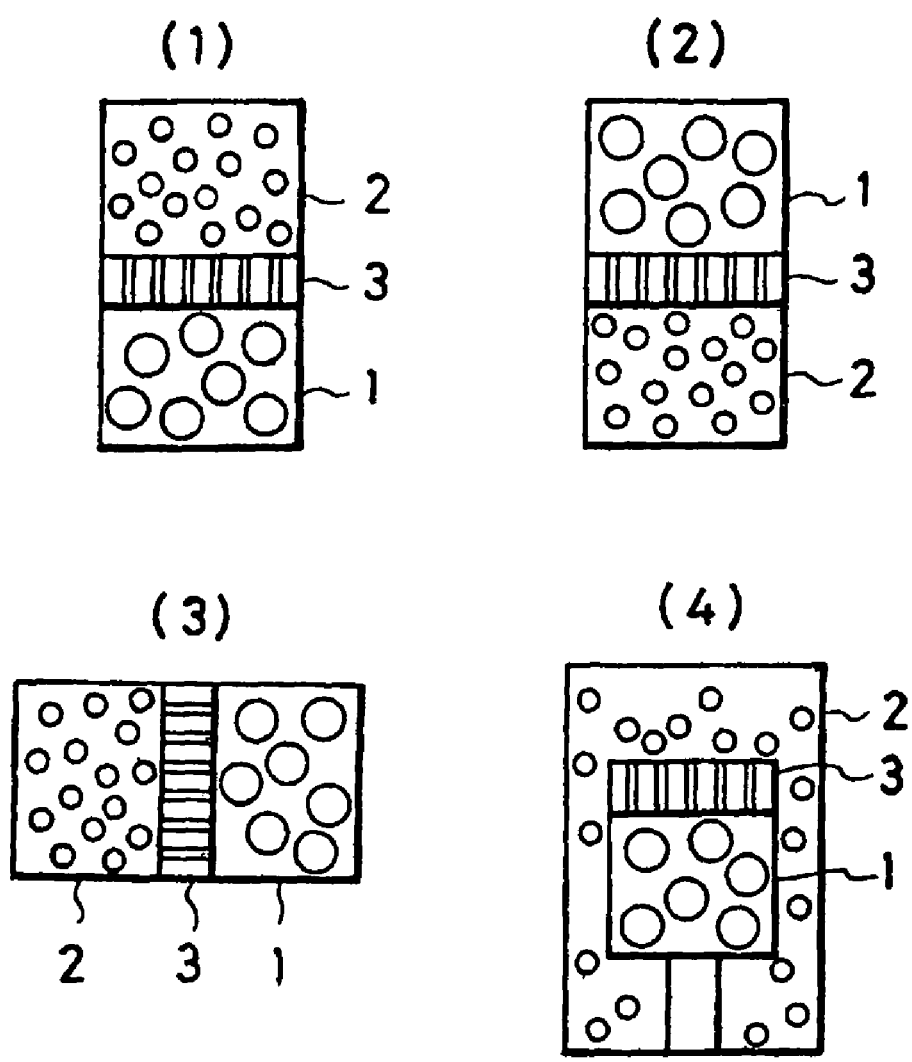
FIGS. 5(1)-(4) are conceptual views of a principal portion of a manufacturing apparatus according to the present invention.
Figure 6:
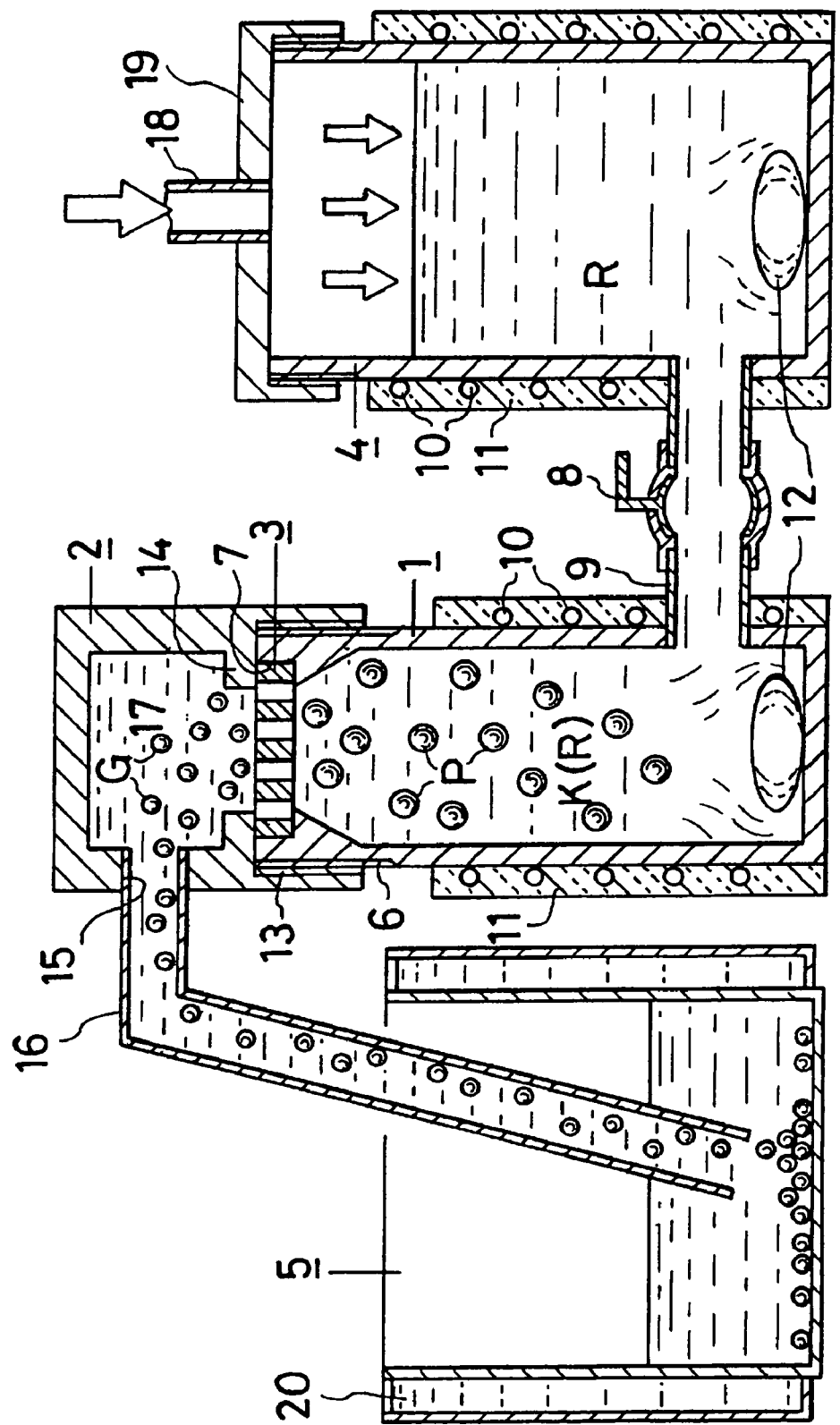
FIG. 6 is an explanatory view of a manufacturing apparatus embodying FIG. 5(1).

In the conceptual views of different embodiments of a manufacturing apparatus shown in FIG. 5, 1 indicates a mixing chamber which constitutes a dispersing mechanism, 2 indicates a forming chamber which constitutes a portion of a cooling mechanism, and 3 indicates a porous membrane. In FIG. 5(1), the mixing chamber 1 is disposed in the lower portion and the forming chamber 2 is located above it with the porous membrane 3 between them. In this case, a mixture of liquid metal coarse particles and a heat resistant continuous phase liquid is forced to move upwards from below, and when it passes through the porous membrane, it forms liquid metal fine particles. In FIG. 5(2), the mixing chamber 1 is in the upper portion, and the forming chamber 2 is disposed below it with the porous membrane 3 between them, so the mixture is forced to move downwards from above. In FIG. 5(3), the mixing chamber 1, the porous membrane 3, and the forming chamber 2 are disposed horizontally in series, and the mixture is forced to move from the right to the left in the figure. In FIG. 5(4), the mixing chamber 1 having the porous membrane 3 installed at its top is housed inside the forming chamber 2. In this case, the mixture in the mixing chamber 1 disposed inside the forming chamber 2 is forced to move upwards, and it forms liquid metal fine particles as it is forced to pass into the forming chamber.

Next, an embodiment of a manufacturing apparatus based on the conceptual view in FIG. 5(1) will be described by referring to FIG. 6. The manufacturing apparatus of this embodiment comprises a mixing chamber 1, a forming chamber 2, a porous membrane 3, a pressure vessel 4, and a cooling vessel 5. The mixing chamber 1 has the general shape of a cylinder closed at its bottom, and it has a male (external) thread 6 formed on the outer side of its upper end and a circular recess 7 on the inner side of its upper end. A connecting pipe 9 having a ball valve 8 midway along its length is connected to the side wall of the lower portion of the mixing chamber, and the other end of this pipe is connected to the pressure vessel 4. An electric heater 10 is wound around the exterior of the mixing chamber 1, and the outside of the electric heater is covered with a heat insulator 11. A stirring element in the form of a spin bar 12 is disposed at the bottom of the interior of the mixing chamber 1. The spin bar 12 is adapted to rotate by an unillustrated magnetic stirrer which is disposed on the outside of the bottom of the mixing chamber 1.

The forming chamber 2 has the shape of a lid with a high ceiling. On its inner side is formed a female (internal) thread 13 which engages with the male thread 6 of the mixing chamber 1. An internal flange 14 having a larger diameter than the recess 7 of the mixing chamber is formed midway along the height of the forming chamber 2. A hole 15 is bored through the side wall of the forming chamber 2, and a discharge pipe 16 is connected to this hole.

The porous membrane 3 has a disc shape which can fit in the recess 7 of the mixing chamber 1.

An electric heater 10 is wound around the exterior of the pressure vessel 4, and the outside of the electric heater is covered with a heat insulator 11. To the top of the pressure vessel 4 is attached by threads a lid member 19 to which a gas inflow pipe 18 is connected, and the gas inflow pipe is also connected to an unillustrated source of compressed gas. A stirring device in the form of a spin bar 12 is also disposed on the bottom of the interior of the pressure vessel 4. The spin bar 12 is adapted to rotate by an unillustrated magnet rotor which is disposed on the outside of the bottom of the pressure chamber 4.

The cooling vessel 5 is a vessel closed at its bottom. Its volume is greater than the combined volume of the mixing chamber 1, the forming chamber 2, and the pressure vessel 4. The exterior of the cooling vessel 5 is covered by a water jacket 20. Cooling water flows into the water jacket 20 through an unillustrated inlet and exits therefrom through an unillustrated outlet so that it cools the exterior of the cooling vessel 5 with water.

The porous membrane used in the present invention is not limited to a disc shape, and depending upon the shape and positional relationship of the mixing chamber and the forming chamber, other shapes can be used for the porous membrane such as a cylindrical shape. In addition, the types of the heating means, the dispersing means, the pressurizing means, the cooling means, and the like do not is essentially affect the results of the present invention, and optimal ones can be suitably selected by considering the necessary manufacturing capacity and the like into consideration.

Next, a manufacturing method for low melting point metal fine particles using an apparatus having the above-described structure will be described.

In a state in which the ball valve 8 of the connecting pipe 9 is closed, a heat resistant continuous phase liquid R, which is a mixture of a heat resistant liquid and a dispersion stabilizer as stated above, is introduced into the mixing chamber 1 and the pressure chamber 4, and it is heated by the respective heaters 11 with stirring by the respective spin bars 12. When the temperature of the heat resistant continuous phase liquid R reaches the vicinity of the melting point of a low melting point metal, solid coarse particles of a low melting point metal are charged into the heat resistant continuous phase liquid R in the mixing chamber 1, and heating is continued such that the temperature is at least the melting point of the solid metal coarse particles. The resulting liquid metal coarse particles P which are melted into liquid in the heat resistant continuous phase liquid is uniformly dispersed in the heat resistant continuous phase liquid by the stirring of the spin bar 12 to form a mixture K. After it has been ascertained that the temperature of this mixture K is maintained at a predetermined temperature, the necessary gas pressure is applied to the heat resistant continuous phase liquid in the pressure chamber 4 by introducing a nitrogen gas into the pressure chamber 4 through the gas inflow pipe 18 from a nitrogen gas cylinder as a pressure source, and the ball valve 8 of the connecting pipe is opened. As a result, the heat resistant continuous phase liquid in the pressure chamber 4 flows into the mixing chamber 1 through the connecting pipe 9, whereby the mixture K is forced to pass through the porous membrane immediately into the forming chamber 2. The heat resistant continuous phase liquid and the resulting liquid metal fine particles which entered the forming chamber 2 then flow into the cooling vessel 5 through the discharge pipe 16 connected to the hole 15 in the forming chamber 2. Since the periphery of the cooling vessel 5 is cooled by the water jacket 20, the heat resistant continuous phase liquid and the low melting point metal fine particles which have entered the cooling vessel 5 are cooled so that the liquid metal fine particles solidify.

Next, examples of manufacturing low melting point alloy fine particles according to the present invention will be described.

EXAMPLE 1

Using 44.7Bi-22.6Pb-8.3Sn-5.3Cd-19.1In (melting point of 46.8° C., supplied by Nilako Corp.) as a low melting point metal, coarse particles of this low melting point metal with a mean particle diameter of 37 micrometers were prepared by the membrane emulsification method (Japanese Patent Application No. 2001-328672) proposed by one of the present inventors in which a liquid metal is passed through a porous membrane so as to form liquid metal particles dispersed in a continuous liquid phase. A flat hydrophilic porous glass membrane (supplied by SPG Technology Co., Ltd.) was used in a manufacturing apparatus for low melting point metal fine particles according to the present invention, and three types of this membrane having a pore diameter of 20.2 micrometers, 10.9 micrometers, or 5.5 micrometers were used. Toluene was used as a heat resistant continuous phase liquid, and tetraglycerol condensed ricinoleate ester (TGCR) (supplied by Sakamoto Yakuhin Kogyo Co., Ltd.) was used as a dispersion stabilizer with a concentration of 5 mass percent in the liquid.

In Example 1, a pressure of 0.5 MPa, 1.35 MPa, or 3.5 MPa was applied to force a mixture of the coarse particles and the continuous phase liquid to pass through the porous membrane having a pore diameter of 20.2 micrometers, 10.9 micrometers, or 5.5 micrometers, respectively. The heat resistant continuous phase liquid and low melting point metal fine particles formed by passage through the porous membrane were passed into a cooling vessel for cooling, and after the low melting point metal fine particles in liquid state solidified, the continuous phase liquid was removed by decantation, and the remaining low melting point metal fine particles were washed with toluene and then dried in a vacuum oven. The low melting point metal fine particles obtained in this example had a mean particle diameter of 11.5 micrometers, 7.9 micrometers, or 4.8 micrometers, respectively, which was of the same order or smaller than the pore diameter of the porous is membrane which was used. Namely, according to the present invention, by selecting the pore diameter of a porous membrane which is used, low melting point metal fine particles having a desired particle diameter can be manufactured.

EXAMPLE 2

In the present invention, even if porous membranes having the same pore diameter are used, if the speed of passage through the porous membranes changes, the particle size distribution of the resulting low melting point metal fine particles changes. When the pore diameter of porous membranes is the same, if passage through the porous membranes take place under the same conditions, the speed of passage increases as the applied pressure increases. To this end, the applied pressure was varied in the following manner. Using the same low melting point metal coarse particles as used in Example 1, a flat hydrophilic porous glass membrane with a pore diameter of 20.2 micrometers as a porous membrane, and toluene containing 5 mass percent of tetraglycerol condensed ricinoleate ester (TGCR) as a heat resistant continuous phase liquid, low melting point metal fine particles were prepared by the same procedure as in Example 1 except that the applied pressure was three levels of 0.4 MPa, 0.7 MPa, and 1.35 MPa. The mean particle diameter of the resulting fine particles was 13.5 micrometers, 10.0 micrometers, or 6.7 micrometers, respectively. From this result, it can be seen that when the pore diameter of porous membranes is the same, as the speed of passage increases, the mean diameter of the resulting fine particles is shifted towards the small diameter side while a certain particle size distribution is maintained.

EXAMPLE 3

Using a 63Sn—Pb eutectic solder alloy (melting point of 183° C.) as a low melting point metal, coarse particles of this solder with a mean particle diameter of 37 micrometers were prepared by the gas atomizing method and used as low melting point metal coarse particles. Using a flat hydrophilic porous glass membrane with a pore diameter of 20.2 micrometers as a porous membrane and a commercially available lubricating oil as a heat resistant liquid, low melting point metal fine particles were prepared by the same procedure as in Example 1 except that the is temperature of the mixture just before passage through the porous membrane was 200° C. and that the applied pressure was 1.45 MPa. The mean particle diameter of the resulting fine solder particles was 9.3 micrometers. Observation under SEM confirmed that the low melting point metal fine particles obtained by the present invention had a nearly spherical shape.

EXAMPLE 4

In the present invention, by repeatedly passing low melting point metal particles through a porous membrane, it is possible to obtain fine particles having a more uniform particle diameter. To this end, low melting point metal fine particles obtained by one passage through a porous membrane were passed through it again to investigate the effect on particle diameter.

Using a lead-free solder (Sn-3Ag-0.5Cu, melting point of 217-220° C., supplied by Senju Metal Industry Co., Ltd. under the trade name of M705) as a low melting point metal, coarse particles of this solder with a mean particle diameter of 37 micrometers were prepared by the gas atomizing method and they are used as low melting point metal coarse particles. Using a pipe-shaped hydrophilic porous glass membrane with a pore diameter of 6.0 micrometers as a porous membrane, a commercially-available lubricating oil as a heat resistant continuous phase liquid, and a sucrose fatty acid ester (supplied by Mitsubishi Kagaku Foods Corp. under the trade name of ER290) with a concentration of 5 mass percent as a dispersion stabilizer, low melting point metal fine particles were prepared by the same procedure as in Example 1 except that the temperature of the mixture just before passage through the porous membrane was 240° C. and that the applied pressure was 4 MPa. Low melting point metal fine particles with a mean particle diameter of 7.3 micrometers were obtained, and they were used as low melting point metal coarse particles and were passed again through a pipe-shaped hydrophilic porous glass membrane with a pore diameter of 6.0 micrometers under the same conditions as for the first time. The second passage through the pipe-shaped hydrophilic porous glass membrane resulted in the formation of low melting point metal fine particles having a mean particle diameter of 4.9 micrometers. It was ascertained that the resulting fine particles had a sharper particle size distribution which shifted toward the small diameter side compared to the low melting point metal fine particles obtained by the first passage.

EXAMPLE 5

In the present invention, as long as the porous membrane has a uniform pore diameter, it is not limited to a porous glass membrane as described above. An example using a material other than porous glass will be described.

Low melting point metal fine particles were prepared by the same procedure as in Example 1 using the same low melting point metal coarse particles with a mean particle diameter of 37 micrometers as used in Example 4, a pipe-shaped asymmetric ceramic membrane (with a composition of $Al_2O_3$, supplied by Toshiba Ceramics Co., Ltd.) having a skin layer with a nominal pore diameter of 3 micrometers as a porous membrane, a commercially available lubricating oil as a heat resistant liquid, and a sucrose fatty acid ester (supplied by Mitsubishi Kagaku Foods Corp. under the trade name of ER290) with a concentration of 5 mass percent as a dispersion stabilizer. The temperature just before passage through the porous membrane was 240° C., and the applied pressure was 4 MPa. The resulting low temperature metal fine particles had a mean particle diameter of 2.6 micrometers and a relatively uniform particle size distribution.

INDUSTRIAL APPLICABILITY

Although the manufacture of solder fine particles with a controlled particle diameter has been described in the examples according to the present invention, the present invention is not limited to the manufacture of solder fine particles, and fine particles of any metal having a controlled particle diameter can be manufactured as long as the metal melts at a temperature at which the heat resistant liquid can be used.

The invention claimed is:

1. A method of manufacturing low melting point metal fine particles comprising applying a pressure to a mixture of coarse droplets of a low melting point metal in a molten state and a heat resistant continuous phase liquid of a substance different from the low melting point metal at a temperature of at least the melting point of the low melting point metal, the pressure being at least sufficient to force the mixture to pass through a porous membrane having at least two penetrating pores, thereby forming the coarse liquid metal droplets into fine liquid metal droplets, including controlling the speed of passage of the coarse liquid metal droplets through the membrane such that the mean particle diameter of the resulting fine liquid metal droplets is within a ran -e which is of the same order or smaller than the more diameter of the porous membrane, and then cooling the fine liquid metal droplets and the heat resistant continuous phase liquid to a temperature equal to or lower than the melting point of the low melting point metal to obtain solid metal fine particles.

2. A method as claimed in claim 1 including passing the fine liquid metal droplets through a porous membrane to increase the uniformity of the particle diameter of the fine liquid metal droplets.

3. A method as claimed in claim 1 wherein the heat resistant continuous phase liquid is mineral oil, vegetable oil, or a glycol.

4. A method as claimed in claim 1 wherein the heat resistant continuous phase liquid contains a dispersion stabilizer.

5. A method as claimed in claim 1 including introducing the mixture of coarse liquid metal droplets and the heat resistant continuous phase liquid to a first side of the porous membrane outside of the pores and applying the pressure to force the mixture through the porous membrane from the first side to a region on a second side of the porous membrane outside of the pores.

6. A method as claimed in claim 5 including preparing the mixture by mixing the coarse liquid metal droplets and the heat resistant continuous phase liquid in a mixing chamber on the first side of the porous membrane.

7. A method as claimed in claim 5 including passing the continuous phase liquid through the membrane a plurality of times.

8. A method as claimed in claim 5 including passing the continuous phase liquid through a plurality of membranes arranged in series.

9. A method as claimed in claim 1 wherein the coarse liquid metal droplets have a mean particle diameter which is larger than the pore diameter of the porous membrane.

10. A method as claimed in claim 1 wherein the mean particle diameter of the fine liquid metal droplets is smaller than the pore diameter of the porous membrane.

11. A method of manufacturing low melting point metal fine particles comprising applying a pressure to a mixture of droplets of a low melting point metal in a molten state and a heat resistant continuous phase liquid of a substance different from the low melting point metal at a temperature of at least the melting point of the low melting point metal on an upstream side of a porous membrane to force the mixture to pass through the porous membrane from the upstream side to a downstream side of the porous membrane to reduce the mean particle diameter of the droplets from a first mean particle diameter on the upstream side of the porous membrane to a second mean particle diameter on the downstream side of the porous membrane, the first mean particle diameter being larger than the pore diameter of the porous membrane, and then cooling the mixture after it passes through the porous membrane to a temperature equal to or lower than the melting point of the low melting point metal to obtain solid metal fine particles.

12. A method as claimed in claim 11 including forcing the mixture to pass through the membrane at a speed such that the second mean particle diameter is of the same order or smaller than the pore diameter of the porous membrane.

13. A method as claimed in claim 12 wherein the second mean particle diameter is smaller than the pore diameter of the porous membrane.

14. A method as claimed in claim 11 wherein the continuous phase liquid comprises oil.

* * * * *